May 4, 1937.  F. MANNING  2,079,297

FILTER

Filed July 30, 1936    2 Sheets-Sheet 1

INVENTOR.
Fowler Manning
BY
his ATTORNEY.

May 4, 1937.  F. MANNING  2,079,297
FILTER
Filed July 30, 1936    2 Sheets-Sheet 2
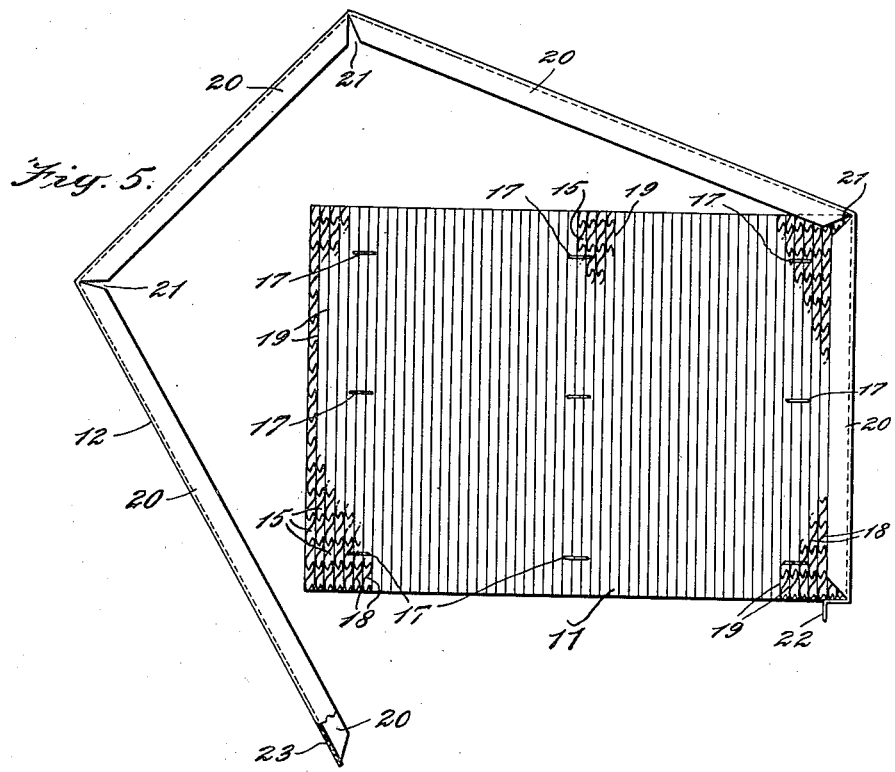
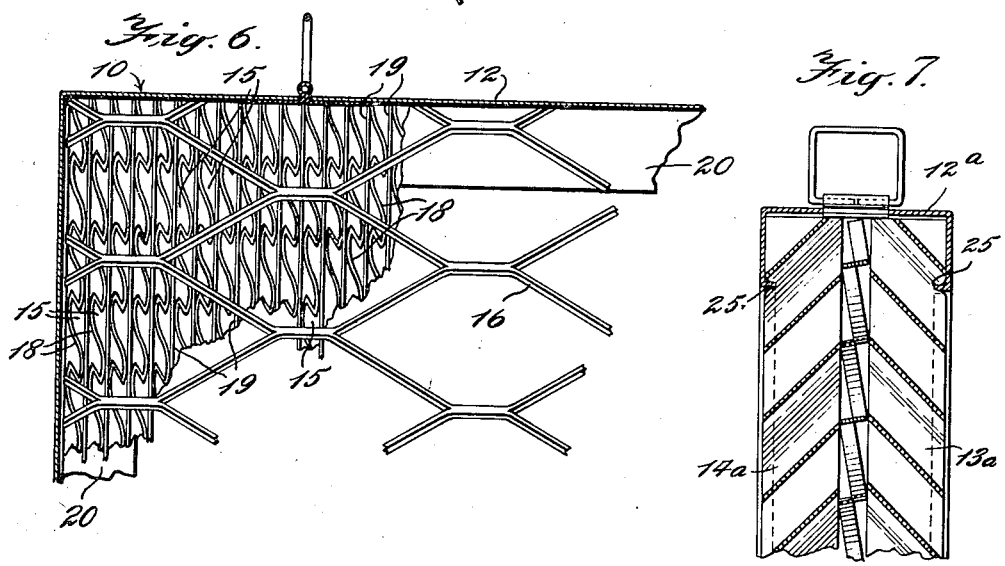
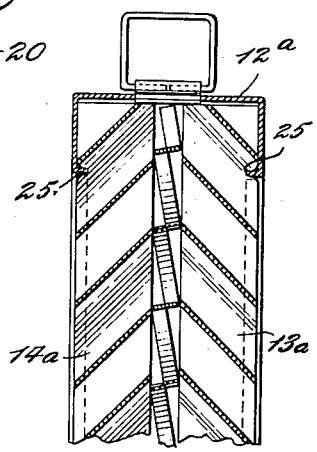
INVENTOR.
Fowler Manning
BY
his ATTORNEY.

Patented May 4, 1937

2,079,297

UNITED STATES PATENT OFFICE 2,079,297

FILTER

Fowler Manning, Bronxville, N. Y., assignor to American Radiator Company, New York, N. Y., a corporation of New Jersey Application July 30, 1936, Serial No. 93,324

8 Claims. (Cl. 183—69)

My invention relates to filtering devices, and more particularly to a composite filter of the type used to remove solid particles entrained in a stream of gas flowing therethrough; for example, a filter of the type adapted to be arranged across a ventilating passage for removing dust, dirt, pollen, etc. from a stream of air flowing through the passage.

The objects of my invention are comprised in the provision of a composite filter which is of improved construction; one which abstracts an unusually large percentage of the solid particles entrained in a gas stream yet offers a minimum of resistance to the flow of the gas therethrough; and one which is comparatively inexpensive to manufacture, and is unusually strong and durable and will continue to operate effectively and efficiently until its passages are filled with the abstracted solid particles, even though it may be exposed to rain and snow.

The invention consists in the novel construction and combination of parts, to be more fully described hereinafter, and the novelty of which will be particularly pointed out and distinctly claimed.

In the accompanying drawings, to be taken as a part of this specification, I have fully and clearly illustrated a preferred embodiment of my invention, in which drawings—

Fig. 5 is an elevational view illustrating the manner in which the frame is assembled about the remaining parts of the composite filter;

Fig. 6 is an enlarged sectional view on the line 6—6 of Fig. 2 and illustrating more clearly the combined spacing and stiffening means; and Fig. 7 is an enlarged fragmentary sectional view taken on the same plane as Fig. 2, but showing a modified form of frame.

Referring now in detail to the construction illustrated, it will be observed that I have shown my invention as embodied in a composite or unitary filter 10 which is adapted to be arranged across a gas pass and is provided with a multitude of passages extending therethrough and operates to abstract solid particles entrained in the gas as it flows through the passages.

The composite filter comprises a filter proper 11 and a metallic frame 12 extending about the periphery of the filter proper and securely holding the elements of the latter in their proper relative positions.

Figure 1:
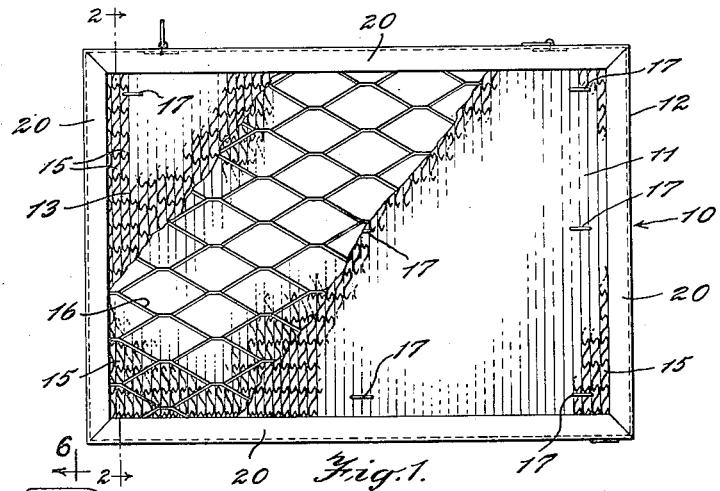
Fig. 1 is an elevation showing my improved form of composite filter with a portion of the filtering element broken away to disclose the combined spacing and stiffening means for the filter.
Figure 2:
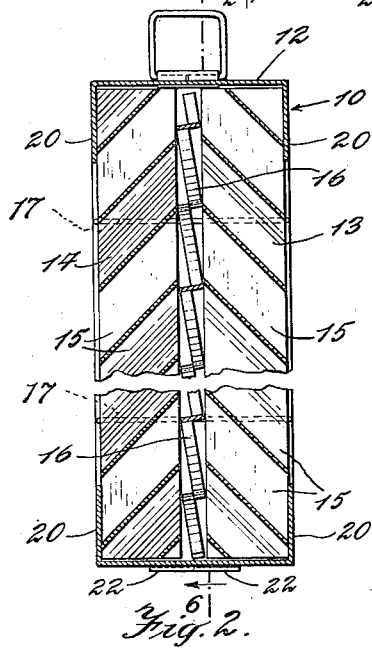
Fig. 2 is an enlarged fragmentary sectional view taken on the line 2—2 of Fig. 1.

The filter proper is formed of a pair of similar filtering elements 13 and 14, each element being provided with passages 15 for the flow of air or gas therethrough, with the passages 15 of one element 13 being arranged at angles to the passages 15 of the other element 14 so as to provide tortuous paths for the flow of air therethrough. The filtering elements 13 and 14 are arranged and held in spaced parallel relation, as shown in Fig. 2, by means of an improved form of spacing and stiffening means 16 and staples 17 extending through the filtering elements 13 and 14 and the spacing and stiffening means 16.

Figure 4:
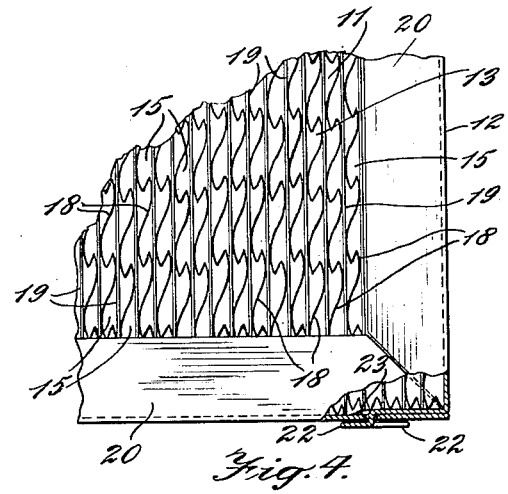
Fig. 4 is an enlarged front elevation of the structure at the lower right-hand corner of Fig. 1 with parts being broken away and shown in section to illustrate more clearly the means for securing the frame together, illustrated in Fig. 3.

As will be observed from examination of Fig. 4, each of the filtering elements is composed of a plurality of strips 18 of corrugated flexible absorbent material. The corrugated strips 18 are separated by straight strips 19, and the strips 18 and 19 are firmly secured together by any suitable means, such, for example, as an adhesive. The corrugated strips 18 and the straight strips 19 are arranged edgewise to the direction of flow of the gas, and the corrugations 18 provide the passages 15 for the flow of the gas through the filter. While any number of materials may be found which are flexible and absorbent, without departing from the scope of the present invention, I have found that paper is admirably suited for this purpose, as it is inexpensive and may be easily corrugated. The paper may be fireproofed if desired.

The surfaces of the filtering elements 13 and 14 may be coated with a suitable viscous material such as oil, so that the solid particles in the gas will stick to the sides of the passages 15 as the gas flows therethrough. As the passages 15 of one filter element 13 are arranged at angles to the passages 15 of the other element 14, tortuous passages are provided through the filter which cause the solid particles to be thrown against the oil-coated sides of the passages and thereby increase the efficiency of the filter. The spacing of the filter elements also aids in the abstracting of solids from the gas, as it provides a break in the air passages and permits some of the particles to fall out of the stream and some to engage the oil-coated inner faces of the filter elements.

Figure 3:
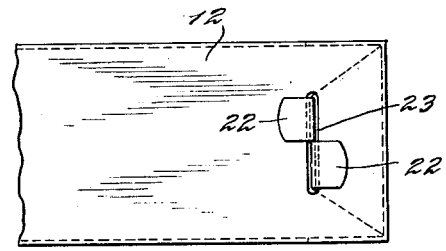
Fig. 3 is an enlarged fragmentary view illustrating the means for securing together the metallic frame for the filter.

The frame 12 provides a suitable means for holding the filter proper and preventing any damage thereto when it is being handled or inserted in position in a gas pass. The frame 12 is preferably formed from a single strip of metal which is formed with flanges 20 which engage the outer faces of the elements at the periphery. Notches 21 are cut in the metal previous to the formation of the flanges, so as to permit the frame to be bent into a rectangular frame (see Fig. 5). The free ends of the frame may be secured together by any suitable means, for example by tabs 22 formed on one of the free ends and extending through a slot 23 formed in the other free end, and then by bending the tabs in opposite directions as indicated in Figs. 3 and 4.

In accordance with the present invention, I provide an improved form of spacing and stiffening means. This means is preferably a sheet of expanded metal coextensive in size with the filtering elements 13 and 14 and held in close engagement with the opposed inner faces of said filtering elements. I have found that the expanded metal effectively performs the combined function of spacing the filter elements and of stiffening a filter of the type which is made of flexible absorbent material, so that the filter will not warp or the strips composing the filtering elements will not separate when the filter is placed in position, even though it be subjected to the deteriorating effect of the rain or snow. I am aware that composite filters have been heretofore produced which are provided with spacing means between the filtering elements; but, so far as I know, an expanded metal sheet has not been used. The expanded metal is comparatively inexpensive, and by virtue of its peculiar formation is sufficiently thick to provide the proper spacing between the elements, and due to its rigidity provides an effective and inexpensive stiffener for the filter.

In Fig. 7 of the drawings, I have shown a modified form of frame 12a for the filtering element. The frame 12a shown in Fig. 7 is of the same type as the frame 12 of the previously described modification, and in addition is provided with inturned flanges 25 at the inner edges thereof which are pressed into engagement with the outer faces of the filtering element 13a and 14a and serve to both secure the filtering elements together and to provide a protecting frame thereabout. With the inturned flanges, the majority of the securing staples may be omitted.

From the above description, it will be readily seen that applicant has produced an efficient form of filter which is unusually inexpensive to manufacture yet is rugged and durable. The item of manufacturing cost is an extremely important item to be considered in filters of the type disclosed herein, as they are usually thrown away when the passages become clogged with solid particles and replaced by a fresh filter.

What I claim and desire to secure by Letters Patent of the United States is:—

1. A composite air filter comprising, in combination, a pair of similar filtering elements arranged parallel to one another with their inner opposed faces in closely spaced relation and each element having a multitude of air passages extending therethrough; a combined spacing and stiffening means arranged between said elements and comprising a sheet of expanded metal arranged parallel to and engaging at opposite sides thereof the inner faces of said elements; and means for securely fastening the elements and expanded metal sheet together to form an inseparable unit.

2. A composite air filter comprising, in combination, a pair of similar filtering elements arranged parallel to one another with their inner opposed faces in closely spaced relation and each element having a multitude of air passages extending therethrough; the air passages of one of said elements being arranged at angles to the air passages extending through the other of said elements so as to provide tortuous paths for the flow of air through said filtering elements; a combined spacing and stiffening means arranged between said elements and comprising a sheet of expanded metal arranged parallel to and engaging at opposite sides thereof the inner faces of said elements; and means for securely fastening the elements and expanded metal sheet together to form an inseparable unit.

3. A composite air filter comprising, in combination, a pair of similar filtering elements arranged in parallel relation to one another with their inner opposed faces in closely spaced relation; each of said elements being formed of an absorbent fibrous material and having a multitude of passages extending therethrough; a combined spacing and stiffening means arranged between said elements and comprising a sheet of expanded metal arranged parallel to and engaging at opposite sides thereof the inner faces of said elements; and means for securely fastening the elements and expanded metal sheet together to form an inseparable unit.

4. A composite air filter comprising, in combination, a pair of similar filtering elements arranged in parallel relation to one another with their inner opposed faces in closely spaced relation; each of said elements being formed of a plurality of strips of corrugated fibrous material securely fixed together and arranged with the corrugations defining a multitude of passages extending through the elements; a combined spacing and stiffening means arranged between said elements and comprising a sheet of expanded metal arranged parallel to and engaging at opposite sides thereof the inner faces of said elements; and means for securely fastening the elements and expanded metal sheet together to form an inseparable unit.

5. A composite air filter comprising, in combination, a pair of similar filtering elements arranged parallel to one another with their inner opposed faces in closely spaced relation and each element having a multitude of air passages extending therethrough; a combined spacing and stiffening means arranged between said elements and comprising a sheet of expanded metal arranged parallel to and engaging at opposite sides thereof the inner faces of said elements; and means extending through said elements and expanded metal sheets for securely fastening them together as a unit.

6. A composite air filter comprising, in combination, a pair of similar filtering elements arranged parallel to one another with their inner opposed faces in closely spaced relation and each element having a multitude of air passages extending therethrough; a combined spacing and stiffening means arranged between said elements and comprising a sheet of expanded metal arranged parallel to and engaging at opposite sides thereof the inner faces of said elements;

and stapling means extending through said elements and expanded metal sheet for securely fastening the three together as a unit.

7. A composite air filter comprising, in combination, a pair of similar filtering elements arranged parallel to one another with their inner opposed faces in closely spaced relation and each element having a multitude of air passages extending therethrough; a combined spacing and stiffening means arranged between said elements and comprising a sheet of expanded metal arranged parallel to and engaging at opposite sides thereof the inner faces of said elements; and metallic frame means extending about the periphery of said elements and having flange portions engaging the exterior faces thereof for securely holding the elements and expanded metal sheet together as a unit.

8. A composite air filter comprising, in combination, a pair of similar filtering elements arranged parallel to one another with their inner opposed faces in closely spaced relation and each element having a multitude of air passages extending therethrough; a combined spacing and stiffening means arranged between said elements and comprising a sheet of expanded metal arranged parallel to and engaging at opposite sides thereof the inner faces of said elements; stapling means extending through said elements and expanded metal sheet for securely fastening the three together as a unit; and metallic frame means extending about the periphery of said elements and including flange portions engaging the exterior faces thereof, and thereby aiding in securely fastening the elements and expanded metal sheet together.

FOWLER MANNING.